(12) United States Patent
Pallaro

(10) Patent No.: US 10,891,880 B2
(45) Date of Patent: Jan. 12, 2021

(54) METHOD FOR THE PRODUCTION, RECOGNITION, IDENTIFICATION, READING AND TRACEABILITY OF A SEAL OR LABEL, SEAL OR LABEL AND APPARATUS FOR THE RECOGNITION, IDENTIFICATION, READING AND TRACEABILITY OF SAID SEAL OR LABEL

(71) Applicant: PUNTO 2 S.R.L., Padua (IT)

(72) Inventor: Ronnie Pallaro, Padua (IT)

(73) Assignee: PUNTO 2 S.R.L., Padua (IT)

( * ) Notice: Subject to any disclaimer, the term of this patent is extended or adjusted under 35 U.S.C. 154(b) by 0 days.

(21) Appl. No.: 16/335,438

(22) PCT Filed: Sep. 21, 2017

(86) PCT No.: PCT/IB2017/055723
§ 371 (c)(1),
(2) Date: Mar. 21, 2019

(87) PCT Pub. No.: WO2018/055542
PCT Pub. Date: Mar. 29, 2018

(65) Prior Publication Data
US 2020/0020252 A1    Jan. 16, 2020

(30) Foreign Application Priority Data
Sep. 21, 2016    (IT) .................. 102016000094922

(51) Int. Cl.
*G06F 3/03*        (2006.01)
*G09F 3/03*        (2006.01)
(Continued)

(52) U.S. Cl.
CPC .......... *G09F 3/0335* (2013.01); *B29C 45/164* (2013.01); *G06K 5/00* (2013.01);
(Continued)

(58) Field of Classification Search
CPC . G09F 3/02; G09F 3/03; G09F 3/0335; G09F 3/0292; G09F 3/0341; G06K 5/00;
(Continued)

(56) References Cited

U.S. PATENT DOCUMENTS 6,405,095 B1 * 6/2002 Jang .................. G05B 19/4099
                                                    700/118
7,306,757 B2 * 12/2007 Harrington ......... B29C 33/3857
                                                    264/245
(Continued)

FOREIGN PATENT DOCUMENTS

CN           2669302 Y       1/2005
CN        101133425 A        2/2008
(Continued)

OTHER PUBLICATIONS

International Search Report and Written Opinion of the International Searching Authority for International Patent Application No. PCT/IB2017/055723 dated Jan. 17, 2018, 12 pages.
(Continued)

*Primary Examiner* — Andrew W Bee
(74) *Attorney, Agent, or Firm* — Merchant & Gould P.C.

(57) ABSTRACT

A method is for the production, recognition, identification, reading and traceability of a seal or label (4). The method includes preparing a mold (64) for the seal or label (4), injecting inside a molding chamber (68) of the mold (64) a first material constituting a matrix (72) of the seal or label (4). A second, tracking material is injected inside the molding chamber (68) of the mold (4). The second, tracking material (76) is mixed into the matrix (72) at random, creating a pattern inside the matrix (72). The pattern defines a marking (16) of the seal or label (4).

14 Claims, 2 Drawing Sheets

(51) Int. Cl.
  *G06K 5/00*   (2006.01)
  *G09F 3/00*   (2006.01)
  *B29C 45/16*  (2006.01)

(52) U.S. Cl.
  CPC .......... *G09F 3/0292* (2013.01); *G09F 3/0297* (2013.01); *G09F 3/0341* (2013.01)

(58) Field of Classification Search
  CPC ..... B29C 45/00; B29C 45/16; B29C 45/1634; B29C 45/164
  See application file for complete search history.

(56) References Cited

U.S. PATENT DOCUMENTS

| | | | | |
|---|---|---|---|---|
| 9,202,770 | B1 * | 12/2015 | Foong | H01L 23/3675 |
| 2011/0258896 | A1 * | 10/2011 | Watson | B29C 45/2708 |
| | | | | 40/664 |
| 2013/0133165 | A1 | 5/2013 | Mrocki et al. | |
| 2013/0257594 | A1 * | 10/2013 | Collins | G06K 7/01 |
| | | | | 340/10.1 |
| 2017/0334145 | A1 * | 11/2017 | McDonald | B29C 65/02 |

FOREIGN PATENT DOCUMENTS

| | | | | |
|---|---|---|---|---|
| CN | 102099844 | A | 6/2011 | |
| CN | 202897138 | U | 4/2013 | |
| CN | 203038321 | * | 7/2013 | ............ G06Q 30/00 |
| CN | 203038321 | U | 7/2013 | |
| CN | 103354060 | A | 10/2013 | |
| CN | 105139064 | A | 12/2015 | |
| CN | 204904313 | U | 12/2015 | |
| WO | 2014/062066 | A1 | 4/2014 | |

OTHER PUBLICATIONS

Chinese Search Report for Chinese Patent Application No. 2017800680882 dated Sep. 2, 2020, 3 pages.

* cited by examiner

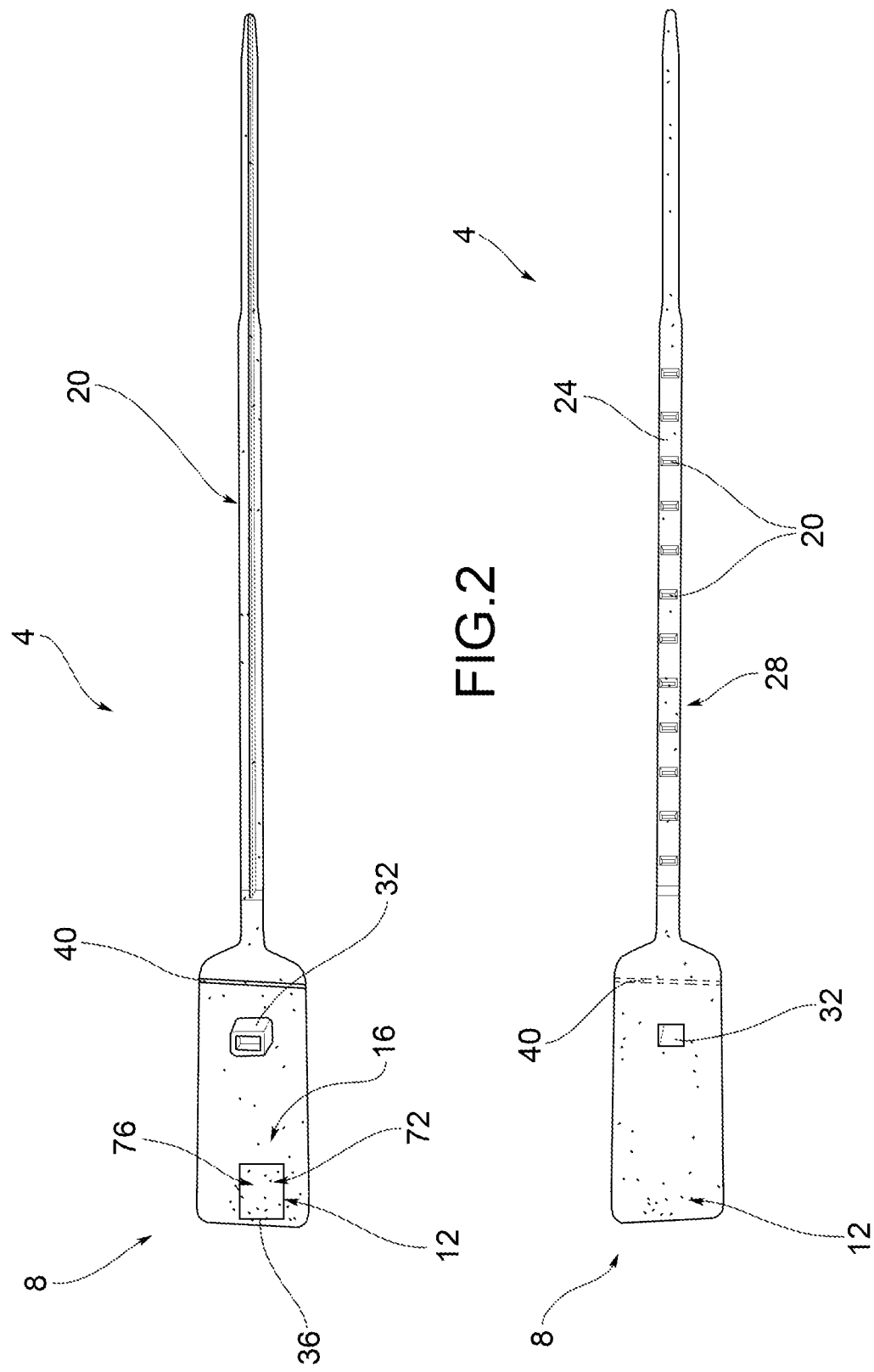

METHOD FOR THE PRODUCTION, RECOGNITION, IDENTIFICATION, READING AND TRACEABILITY OF A SEAL OR LABEL, SEAL OR LABEL AND APPARATUS FOR THE RECOGNITION, IDENTIFICATION, READING AND TRACEABILITY OF SAID SEAL OR LABEL

This application is a National Stage Application of PCT/IB2017/055723, filed 21 Sep. 2017, which claims the benefit of Ser. No. 10/2016000094922, filed 21 Sep. 2016 in Italy, and which applications are incorporated herein by reference. To the extent appropriate, a claim of priority is made to each of the above-disclosed applications.

SCOPE

The present invention relates to a method for the production, recognition, identification, reading and traceability of a seal or label, a seal or label, and an apparatus for the recognition, identification, reading and traceability of said seal and label.

STATE OF THE ART

As is known, it is of utmost importance in the seal or label sector to have a process and a system for recognition, identification, reading and traceability of a seal or label that is reliable and repeatable.

At the same time, the system must guarantee a minimal cost both of the seal or label and the steps of recognition, identification, reading and traceability of the same.

PRESENTATION OF THE INVENTION

To solve the aforementioned problems, some solutions have currently been adopted in the art which involve the production of plastic seals which, after molding, are marked, for example with bar codes or alphanumeric codes, so that they can be identified in a unique way. Such seals may have different types of indicators to detect tampering or openings of the same, in a known manner.

Such solutions in the art, however, involve some disadvantages and limitations.

In fact, the marking step, following the molding step, involves an increase in the overall time and cost of making the seal or label. In addition, known tampering indicators also contribute to increasing the cost and time for producing seals of the known art.

In addition, with regard to the traceability of the seal or label, the known solutions do not allow the route of the seal or label and any possible tampering to be traced in a precise and detailed way, not being able, for example, to identify both the time the seal or label was verified and the person who carried out the same verification.

The need is therefore perceived to resolve the drawbacks and limitations cited with reference to the known art.

DESCRIPTION OF THE DRAWINGS

Further features and advantages of the present invention will become more understandable from the following description of the preferred and non-limiting embodiments thereof, wherein:

FIGS. 2 to 3 are plan views, from both sides, of a seal or label according to an embodiment of the present invention.

Figure 1:
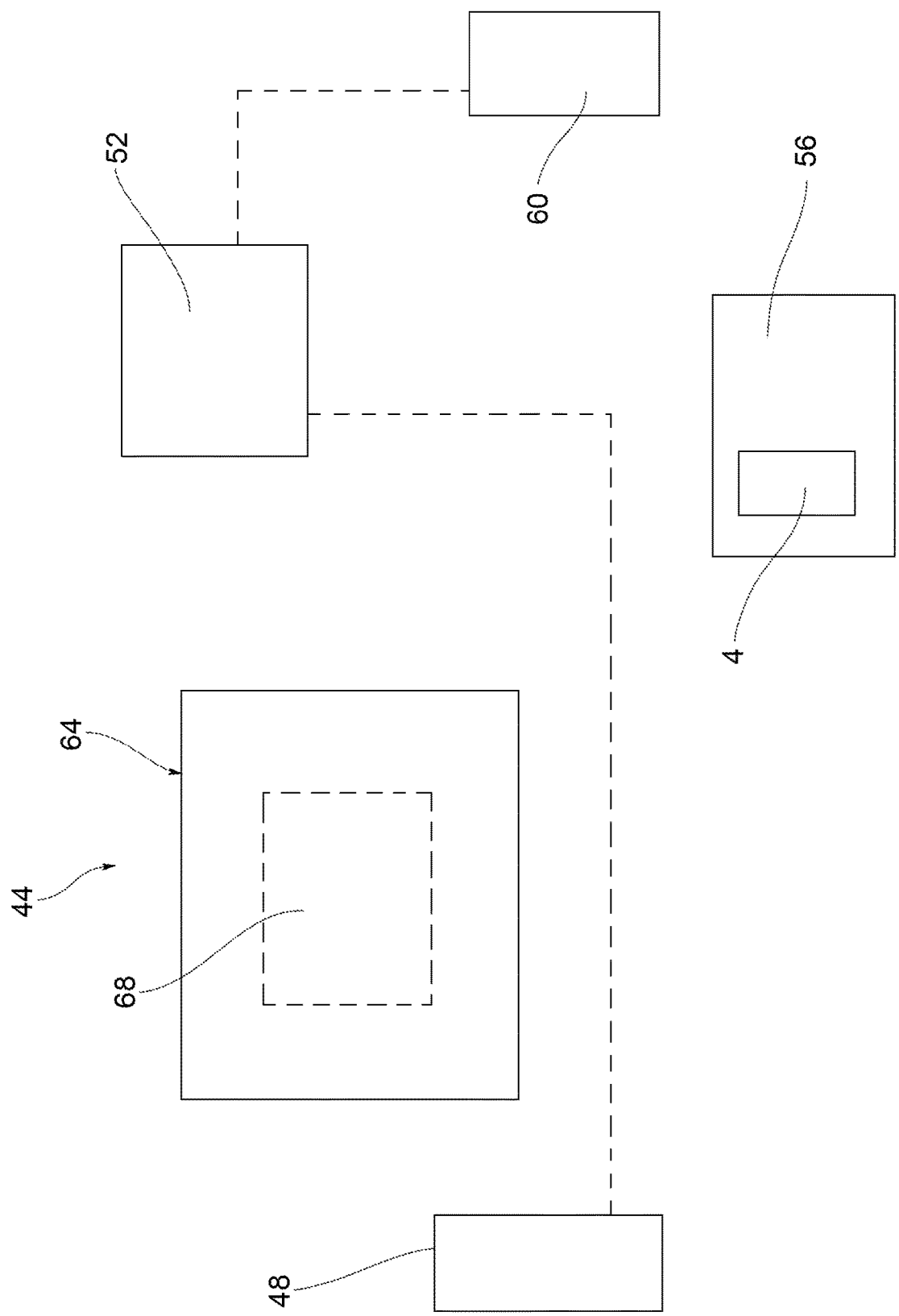
FIG. 1 is a schematic view of an apparatus for recognizing, identifying, reading and tracing said seal or label according to the present invention.

The elements or parts of elements in common between the embodiments described hereinafter will be indicated at the same numerical references.

DETAILED DESCRIPTION

With reference to the aforementioned figures, a collective schematic view of a seal or label according to the present invention is indicated as a whole at 4.

For the purposes of the present invention, it should be noted that the term "seal" or "label" must be considered in the broad sense, comprising any object suitable to act as a closure seal or label, such as an anti-counterfeit label, a wrist band, a tag for animals, a bottle cap, a container for objects of any shape and size. In other words, the present invention applies to any type of label or seal even those not shown in the attached figures.

The seal or label 4 comprises a sealing body or label 8 that delimits a reading area 12 of a marking 16 of the seal or label 4.

"Marking" 16 means a portion that uniquely identifies the seal or label itself; "reading area" 12 means a subset of said marking 16, i.e., a portion of said marking 16 which is sufficient to uniquely identify the seal or label; reading the reading area is simplified and faster than reading the entire marking 16 and also serves to avoid false negatives, as better described hereinafter.

The production of the marking 16 and the reading area 12 will be described in detail hereinafter.

According to a possible embodiment, the seal or label 4 further comprises a closure portion (20) configured so as to achieve an irreversible closure which, once closed, may only be opened after irreversible rupture of the same closure.

For example, the closure portion 20 may include a strap 24 provided with a plurality of protuberances 28 configured to irreversibly slip into a special hole 32 made on the body of the seal or label 8.

The irreversible coupling means that, once the coupling between the protrusion 28 and the hole 32 is achieved, i.e., once the seal or label is closed, it is no longer possible to open it other than by irreversibly breaking the strap 24. This means that the possible opening of the seal or label 4 would leave obvious traces of any opening and/or tampering with the same.

According to one embodiment, said seal or label body comprises a perimeter groove or bas-relief 36 which delimits said reading area 12 of the marking 16 of the seal or label 4.

According to one embodiment, the seal or label body comprises a weakening or rupture line 40 positioned astride said reading area 12 of the marking 16, so as to permit the automatic discovery of possible opening, breakage and/or tampering with the seal or label 4.

The present invention also relates to an apparatus for the recognition, identification, reading and traceability of a seal or label 4.

According to one embodiment, said apparatus 44 comprises at least one portable reader device 48 suitable to scan the reading area 12 of the marking 16 of the seal or label 4 a first time, at least one shared space 52 comprising a data storage unit operatively connected remotely with said portable reader device 48, so as to be able to receive and store the scan of the reading area 12 of the marking 16 of the seal or label 4, at least one object 56 on which said seal or label 4 is applied and closed, at least one additional portable reader device 60 suitable to read said reading area 12 of the marking 16 of the seal or label 4, wherein said additional portable reader device 60 is operatively connected remotely with the shared space 52 to send to the latter the scan of the reading area 12 of the marking 16 of the seal or label 4 and to compare it with the scan stored in said shared space 52, in order to verify the correspondence and integrity thereof.

It should be noted that the portable reader devices 48, 60 may also coincide with each other. In general, these are scanners suitable for capturing an image in digital format. Typically, the first portable reader device 48 may be integrated in the mold or arranged outside of the mold so as to scan the reading area 12 of the marking 16 as soon as the molding is finished and store such digital data in the shared space 52.

The further portable devices 60 are in fact portable devices that are typically worn by the transporter and are small and handy so as to allow quick scanning of the reading area 12 of the marking 16 of the seals 4. For example, said portable devices may comprise simple mobile phones equipped with a special application that allows one to scan an object using the camera optics provided by the mobile phone. Using a simple application on one's mobile phone makes the method of the present invention particularly simple and economical to use, as it does not require the use of special measuring instruments.

As mentioned, the present invention also relates to the method for making, recognizing, identifying, reading and tracing a seal or label 4.

Said method comprises the steps of preparing a mold 64 for said seal or label 4, wherein the mold 4 delimits a molding chamber 68 which defines in negative the form of the seal or label 4 to be molded.

For the purposes of the present invention, the shape and size of the mold 64 and of the seal or label 4 are irrelevant; however, a multiple mold capable of molding a multitude of seals 4 for each molding cycle is preferred.

The method comprises, therefore, the step of injecting inside a molding chamber 68 of the mold 64 a first material constituting a matrix 72 of the seal or label 4.

For the purposes of the present invention, the first material may be any material, but preferably a plastic or polymeric material.

The method further comprises the step of injecting inside the molding chamber 68 of the mold 64 a second, tracking material 76, which is mixed into the matrix 72 at random, creating a pattern inside the matrix, said pattern defining a marking 16 of the seal or label 4.

It is possible to carry out said injection steps of the first and second material 72,76 simultaneously within the mold 64.

It is also possible to carry out said injection steps of the first and second material 72,76 before the materials are introduced into the mold 64 so as to pre-mix said materials before they enter into said molding chamber 68.

In this way, the second tracing material 76 is mixed and at least partly embedded within the matrix 72 at random. In other words, the tracer particles are embedded within the matrix 72. This configuration guarantees over time the location and permanence of tracer particles inside the matrix, which will not come out even after abrasion and wear. This aspect constitutes a significant advantage over solutions providing for affixing the tracer to the surface of the matrix from the outside, for example by spraying, screen printing, and the like. In effect, the latter solutions do not guarantee that the tracer particles will not be inadvertently abraded or removed from the matrix following abrasion, wear or shocks in the handling of the product on which the seal is affixed/applied. On the other hand, because the tracer particles are embedded within the matrix, they can resist shocks and abrasions of various types. This aspect is important because a possible removal or even partial deletion of particles would involve a change in the marking 16 of the seal 4 and the failure to recognize the seal (resulting in erroneous detection of tampering with the seal). It is therefore important that the marking 16 of the seal 4 is kept intact during the steps of transport/storage of the seal 4 and/or its product.

According to one possible embodiment, the tracer 76 comprises particles of material having a coloring and/or a shine and/or degree of roughness different from that of the matrix 72.

In this way, the tracer, depending on its quantity and distribution within the matrix, will create a unique and unrepeatable pattern that determines the marking 16 of the seal or label 4.

Said pattern may, for example, comprise a plurality of dots or, for example, streaks extending into the matrix 72.

Preferably, the tracer 76 comprises particles of unmixable material with respect to that of the matrix 72: in this way, there is always a clear separation between the tracer 76 and the matrix 72 and therefore the tracer 76 is always clearly visible in contrast.

The tracer 76 may, as seen, comprise particles having a different color than the matrix 72, as well as a different shine, transparency, and refractive index.

The molding chamber 68 is shaped so that, following extraction from the mold 64, the seal or label 4 has a reading area 12 of the marking 16 of the seal or label 4, wherein said reading area 12 is a subset of the same seal or label 4.

Preferably, said reading area 12 of the marking 16 of the seal or label 4 is delimited by a perimeter groove or a bas-relief 36.

Preferably, the molding chamber 68 is configured such that, following the extraction from the mold 64, the seal or label 4 comprises a weakening or rupture line 40 positioned astride said reading area 12 of the marking 16, so as to permit the automatic discovery of possible opening, breakage and/or tampering of the seal or label 4.

Preferably, the mold method comprises the step of molding a closure portion 20 of the seal or label 4, wherein said closure portion 20 is configured so as to achieve an irreversible closure which, once closed, can only be opened after the irreversible rupture of the same closure.

The method of the present invention further comprises the steps of:

reading for a first time a reading area 12 of the marking 16 of the seal or label 4 by means of a first portable reader device 48 which scans said reading area 12, acquiring the scan of said reading area 12 and storing it in a shared space 52, applying the seal or label 4 to an object 56, reading said reading area 12 by means of a further portable reader device 60, checking the integrity of the seal or label 4 and its correspondence with the scan of said reading area 12 previously stored in said shared space 52.

The method comprises, therefore, the validation, recognition and identification step of the seal or label 4: according to one embodiment, said recognition and validation step stipulates that there be a match of not less than 50% between the scan of the reading area 12 of the marking 16 performed at the time by the portable reader device 60 and the scan of said reading area 12 of the marking 16 of the seal or label 4, previously stored in the shared space 52.

Preferably, said recognition and validation step stipulates that there be a match of not less than 90% between the scan of the reading area 12 of the marking 16 performed at the time by the portable reader device 60 and the scan of said reading area 12 of the marking 16 of the seal or label 4, previously stored in the shared space 52.

According to one embodiment of the present invention, the method comprises the steps of capturing the time and/or the geographic location of each scanning step of the reading area 12 of the marking 16 of the seal or label 4, and the step of storing, each time, in the shared space 52 such data pertaining to the time and/or the geographic location of the seal or label 4. In this way, it is possible to trace all the temporal and spatial checks of the seal or label, and therefore it is possible to trace the route followed by the product incorporating said seal or label, and it is possible to trace the time and/or spatial interval during which the seal or label was tampered with or broken.

Preferably, the method comprises the step of acquiring beforehand, for example by means of access (login) to the apparatus according to the invention, the identification data of each portable reader device with which to scan the reading area 12 of the marking 16 of the seal or label 4.

For example, said login may occur via a user code and a password that can uniquely identify each user. Obviously, any equivalent identification method available may alternatively be used.

In this way, one can trace back to the user who has verified the integrity and the correspondence of the seal or label 4.

As may be appreciated from the foregoing, the present invention overcomes the drawbacks of the prior art.

In particular, the seal or label is produced in a single molding step that allows both the seal or label and its marking to be produced at the same time. Such marking is, as seen, unique and does not require any further costly steps, as in the solutions of the known art.

Therefore, due to the present invention, the steps of producing and marking the seal or label have lower time and cost expenditures.

Furthermore, the marking, due to the use of the tracer, allows the identification of each seal or label in a unique and unrepeatable way, without having to use any alphanumeric code or symbol, relying solely on the randomness of the deposition and mixing of the tracer with the matrix of the seal or label.

Moreover, as described, the seal retains its integrity over time because the tracer is embedded in the matrix: in other words, the tracer particles are not applied externally on the surface of the matrix but are embedded within it, due to the pre-mixing of the matrix and the tracer prior to introducing the materials inside the mold. In this way the marking does not change as a result of abrasion and wear and guarantees the seal's integrity and recognition over time, avoiding missed recognition and false discovery of tampering.

As seen, the reading area of the marking may be limited with respect to the extension of the entire seal or label: in this way, the recognition, identification and reading steps are facilitated, and the number of data to be read and compared is reduced (along with the possible related errors).

Advantageously, such reading area of the marking may be delimited by a groove or a bas-relief so as to facilitate its detection.

Furthermore, making at least one weakening or rupture line positioned astride said reading area of the marking permits the automatic discovery of any opening, breakage and/or tampering with the seal or label. In effect, the presence of even a slight rupture in this weakening line is a sign of a tampering attempt that is identified at the same time as the reading and recognition of the reading area of the marking. Therefore, any tampering is detected at the same time as the recognition of the seal or label, without requiring further verification steps. Obviously, by tracing the time of the various identifications of the marking area, it is also possible to trace back to the time interval wherein the attempt to tamper with the seal or label or its opening occurred.

Also, as seen, it is possible to detect and trace back to the time and the user who at one time carried out the recognition and reading of the seal or label.

A person skilled in the art, in the object of satisfying contingent and specific requirements, may make numerous modifications and variations to the methods, the seals and the apparatuses described above, all of which are within the scope of the invention as defined by the following claims.

The invention claimed is:

1. Method for the production, recognition, identification, reading and traceability of a seal or label, comprising the steps of:
preparing a mold for said seal or label;
delivering to a molding chamber of the mold a first material comprising a matrix of the seal or label;
delivering to the molding chamber of the mold a second, tracking material, which is mixed into the matrix at random, creating a pattern inside the matrix, said pattern defining a marking of the seal or label;
wherein said mixing of the first and second material is carried out before the materials are introduced into the mold to pre-mix said materials before said materials enter into said molding chamber;
wherein the molding chamber is shaped so that, following extraction from the mold, the seal or label has a reading area of the marking of the seal or label said reading area being a subset of said seal or label; and
wherein said reading area of the marking of the seal or label is delimited by a perimeter groove or a bas-relief.

2. Method according to claim 1, wherein said steps of delivering the first and second material are performed simultaneously.

3. Method according to claim 1, wherein the tracking material comprises particles of material having a coloring and/or a shine and/or degree of roughness different from a coloring and/or a shine and/or degree of roughness of the matrix.

4. Method according to claim 1, wherein the tracking material comprises particles of material unbondable with material of the matrix.

5. Method according to claim 1, comprising a step of molding a closure portion of the seal or label, wherein said closure portion is configured to achieve an irreversible closure which, once closed, can only be opened after irreversible rupture of the closure.

6. Method according to claim 1, comprising the steps of:
reading a first reading area of the marking of the seal or label by a first portable reader device which scans said reading area,
acquiring the scan of said reading area and storing the scan in a shared space,
applying the seal or label to an object, reading said reading area by a further portable reader device, checking a condition of the seal or label and correspondence with the scan of said reading area previously stored in said shared space.

7. Method according to claim 6, comprising a validation step of the recognition and identification of the seal or label, provided there is a match of not less than 50% between the scan of the reading area of the marking performed at the time by the portable reader device and the scan of said reading area of the marking of the seal or label previously stored in the shared space.

8. Method according to claim 6, comprising steps of capturing the time and/or the geographic location of each scanning step of the reading area of the marking of the seal or label, and the step of storing, each time, in the shared space information on the time and/or the geographic location of the seal or label.

9. Method according to claim 6, comprising a step of capturing identification data on each portable reader device scanning the reading area of the marking of the seal or label.

10. A method for the production, recognition, identification, reading and traceability of a seal or label, comprising the steps of:
preparing a mold for said seal or label;
delivering to a molding chamber of the mold a first material comprising a matrix of the seal or label;
delivering to the molding chamber of the mold a second, tracking material, which is mixed into the matrix at random, creating a pattern inside the matrix, said pattern defining a marking of the seal or label;
wherein said mixing of the first and second material is carried out before the materials are introduced into the mold to pre-mix said materials before said materials enter into said molding chamber;
wherein the molding chamber is shaped so that, following extraction from the mold, the seal or label has a reading area of the marking of the seal or label said reading area being a subset of said seal or label; and
wherein the seal or label comprises a weakening or rupture line positioned astride said reading area of the marking to permit automatic discovery of possible opening, breakage and/or tampering of the seal or label.

11. Seal or label made using a method for the production, recognition, identification, reading and traceability of a seal or label, comprising the steps of:
preparing a mold for said seal or label;
delivering to a molding chamber of the mold a first material comprising a matrix of the seal or label;
delivering to the molding chamber of the mold a second, tracking material, which is mixed into the matrix at random, creating a pattern inside the matrix, said pattern defining a marking of the seal or label;
wherein said mixing of the first and second material is carried out before the materials are introduced into the mold to pre-mix said materials before said materials enter into said molding chamber;
the seal or label comprising a seal or label body which delimits a reading area of the marking of the seal or label and a closure portion configured to provide an irreversible closure which, once closed, may be opened only after the irreversible rupture of the same closure portion;
wherein said seal or label body comprises a perimeter groove or bas-relief that delimits said reading area of the marking of the seal or label.

12. Seal or label according to claim 11, wherein the second tracking material is mixed and at least partly embedded within the matrix at random.

13. A seal or label made using a method for the production, recognition, identification, reading and traceability of a seal or label, comprising the steps of:
preparing a mold for said seal or label;
delivering to a molding chamber of the mold a first material comprising a matrix of the seal or label;
delivering to the molding chamber of the mold a second, tracking material, which is mixed into the matrix at random, creating a pattern inside the matrix, said pattern defining a marking of the seal or label;
wherein said mixing of the first and second material is carried out before the materials are introduced into the mold to pre-mix said materials before said materials enter into said molding chamber;
the seal or label comprising a seal or label body which delimits a reading area of the marking of the seal or label and a closure portion configured to provide an irreversible closure which, once closed, may be opened only after the irreversible rupture of the same closure portion;
wherein the seal or label body comprises a weakening or rupture line positioned astride said reading area of the marking to permit automatic discovery of the possible opening, breakage and/or tampering of the seal or label.

14. Apparatus for performing the method of production, recognition, identification, reading and traceability of a seal or label according to claim 1, the apparatus comprising:
at least one portable reader device for scanning a reading area of the marking of the seal or label a first time,
at least a shared space comprising a data storage unit operatively connected remotely with said portable reader device to receive and store the scan of the reading area of the marking of the seal or label,
at least one object to which said seal or label is applied and closed,
at least one additional portable reader device for reading said reading area of the marking of the seal or label, said additional portable reader device being operatively connected remotely with the shared space to send to the shared space the scan of the reading area of the marking of the seal or label and to compare the scan of the reading area of the marking of the seal or label with the scan stored in said shared space to verify correspondence and integrity thereof.

* * * * *